United States Patent

Delhaes

[11] Patent Number: 5,184,383
[45] Date of Patent: Feb. 9, 1993

[54] PRECISION TRANSPORT ROLLER

[75] Inventor: Johannes C. Delhaes, Heerlen, Netherlands

[73] Assignee: Rubber-En Kunststoffabriek, Netherlands

[21] Appl. No.: 459,457

[22] Filed: Jan. 2, 1990

Related U.S. Application Data

[60] Division of Ser. No. 368,903, Jun. 21, 1989, Pat. No. 4,910,845, which is a continuation of Ser. No. 307,769, Feb. 7, 1989, abandoned, which is a continuation of Ser. No. 144,952, Jan. 19, 1988, abandoned.

[30] Foreign Application Priority Data

Jan. 27, 1987 [DE] Fed. Rep. of Germany ....... 3702251

[51] Int. Cl.⁵ .............................................. B21B 31/08
[52] U.S. Cl. ...................................... 226/190; 271/109; 492/45; 492/53; 226/194
[58] Field of Search ................. 29/124, 125, 130, 132; 271/109; 264/273

[56] References Cited

U.S. PATENT DOCUMENTS

| | | | |
|---|---|---|---|
| 3,558,754 | 1/1971 | Martin | 264/273 X |
| 3,700,764 | 10/1972 | Tago | 264/273 |
| 4,015,320 | 4/1977 | Meckel et al. | 29/130 |
| 4,495,683 | 1/1985 | Delhaes . | |
| 4,513,660 | 4/1985 | Brands et al. | 29/132 X |
| 4,522,866 | 6/1985 | Nishikawa et al. | 29/132 X |
| 4,530,140 | 7/1985 | Okamura et al. | 29/132 X |
| 4,631,793 | 12/1986 | Shintaku et al. | 29/132 |

Primary Examiner—Mark Rosenbaum
Assistant Examiner—Frances Chin
Attorney, Agent, or Firm—Mark T. Basseches

[57] ABSTRACT

A roller, and more particularly a precision transport roller formed of elastomeric material is disclosed. The roller is characterized in that the elastomeric material is formed into inner and outer concentric cylinders which are joined together and which encompass therebetween in co-axial relation a rigid cylindrical bushing. Preferably, the inner and outer cylinders are connected by bridges defined by holes formed in the bushing. The bushing may include beveled end faces for facilitating centering of the bushing in a mold.

5 Claims, 2 Drawing Sheets

PRECISION TRANSPORT ROLLER

This is a division of application Ser. No. 368,903 filed Jun. 21, 1989, now U.S. Pat. No. 4,910,845 of Mar. 27, 1990, said application being a continuation of Ser. No. 307,769 filed Feb. 7, 1989 (now abandoned), which in turn is a continuation of Ser. No. 144,952 filed Jan. 19, 1988 (now abandoned).

BACKGROUND OF THE INVENTION

1. Field of the Invention

This invention relates to a roller, in particular a transport roller, made of an elastic body and a bushing arranged concentrically therein.

Such rollers are known generally and serve, for example, for the transport of paper webs or sheets in copying machines, where the rollers are to be disposed on shafts secured against skew.

2. The Prior Art

From DE-PS 31 40 546 a roller is known which consists of a rigid tubular jacket in which at least one elastic bushing is inserted which is bound by an inner and an outer sleeve of metal and holds the jacket concentrically on a shaft. Here the inner sleeve consists of a clamp-on bushing seated on the shaft with a clamping force directed radially inward while the outer sleeve consists of a clamp-in bushing seated in the jacket with a clamping force directed radially outward.

With this known form of realization a stable connection between roller and shaft is formed by means of commercially available attachment means, and it is not necessary to stay within narrow tolerances between the shaft diameter and the inside of the jacket.

If, however, the roller jacket is to consist of an elastic body, the clamp-in sleeve seated in the jacket with a clamping force directed radially outward will, in the known form of realization, bring about an irregular deformation of the elastic jacket. Even if the roller jacket is remachined in the state mounted in the shaft, a sufficiently exact cylindrical form of the roller jacket can be obtained only for a certain temperature state. With every temperature change, which may fluctuate between −40° C., e.g. during air transport, and +70° C., e.g. during operation of the rollers, a deviation from the cylindrical form of the roller jacket will result due to the clamping force of the clamp-in bushing on the elastic roller material.

But even the clamp-on bushing seated on the shaft with a clamping force directed inwardly, which as a whole is responsible for the necessary skew resistance of the roller, is not without disadvantages. In fact, when the slotted clamp-on bushing is vulcanized in the usual manner, rubber material gets through the slot in the bushing to the inner side of the clamp-on bushing, resulting in deformations requiring remachining. A more serious disadvantage, however, results from the fact that as the rollers are slipped onto the shaft, the metallic clamp-on bushing causes longitudinal ruts in the shaft which ruts are unacceptable in particular where the shaft rotates relative to a bearing.

SUMMARY OF THE INVENTION

It is the object of the invention to provide a roller, in particular an elastic transport roller, which combined with a simple construction permits a skew-safe arrangement on a shaft and which, before being applied on the shaft, can be given an exact cylindrical jacket form that is maintained unchanged when the roller is mounted on a shaft. A further object of the invention is the provision of a roller of the type described which does not damage the shaft in any way.

In accordance with the invention, an improved elastic transport roller is formed by providing inner and outer connected, concentric, elastomeric cylinders having disposed therebetween a rigid concentric cylindrical bushing.

The integration, according to the invention, of the rigid bushing in the elastic body between the outside diameter of one and the inside diameter of the other cylinder part, and the at least area wise, direct connection of the cylinder parts with one another, result in a number of very considerable advantages:

The bushing requires no pretreatment, for example for degreasing with subsequent application of an adhesion promoter so that when cladding with the material of which the cylinder parts are made it will adhere securely between them, because by connections between the cylinder parts of the material thereof the bushing is prevented from sliding or skewing relative to the cylinder parts.

The completed body molded with inclusion of the bushing can be applied on a mandrel so as to grind the roller jacket round with the required precision. The roller will maintain the achieved form precision even when being brought to its final position on a shaft under high compressive pressure, because due to the rigid bushing a deformation of the internal cylinder part of the elastic body can have no effect on the external cylinder part surrounding the rigid bushing. The roller, therefore, can be prefabricated completely before being applied on the shaft, and in particular it requires no remachining after having been applied.

The roller can, without impairment of the configuration of its jacket, be pressed onto a shaft whose diameter is greater by a certain amount than the inside diameter of the internal cylinder part in the relaxed state. After the roller has been applied on the shaft, the cylinder part is, due to a corresponding displacement of the cylinder part material in radial direction against the inner side of the rigid bushing, pressed correspondingly firmly between the shaft and the bushing thereby ensuring a correspondingly strong protection against skewing between the shaft and the roller.

According to an especially advantageous form of the invention, radial openings are formed in the rigid bushing which openings are filled by bridges between the cylinder parts of the elastic material during casting or molding.

Although it is possible in principle to dispense with the openings in the bushing and to make the cylinder parts wider than the bushing to allow then to fuse on the end faces with inclusion of the bushing, tests have shown that connecting the cylinder parts through radial openings in the bushing has two essential advantages:

Connecting the cylinder parts over a number of spaced points along the length of the roller leads not only to a more homogenous body but also to a more intensive connection between the cylinder parts than a connection limited to its end face regions.

During formation, as by casting or molding, a bushing whose length corresponds to the length of the cylinder parts can be clamped in a mold in a simple manner and can thus be fixed with sufficient precision without the need for expensive auxiliary devices.

Preferably the openings are arranged in uniform distribution over the generated surface of the bushing, thus laying the basis for a generally stable connection between two cylinder parts.

To be able to clamp the bushing centered inside the mold in an especially simple manner, in which mold the body consisting essentially of two cylinder parts is to be poured, one form of the invention lastly provides that both end faces of the bushing are provided with a bevel conically inclined toward the center of the bushing.

Due to the beveling of the end face of the bushing, the latter can be accurately centered between two conical pieces adapted to the bevels in the manner of a male die. These conical pieces may be components of the mold axially displaceable by themselves or together with mold parts.

BRIEF DESCRIPTION OF THE DRAWINGS

An embodiment example of a roller according to the invention is illustrated in the drawing, in which.

DETAILED DESCRIPTION OF THE VIEWS

Figure 1:
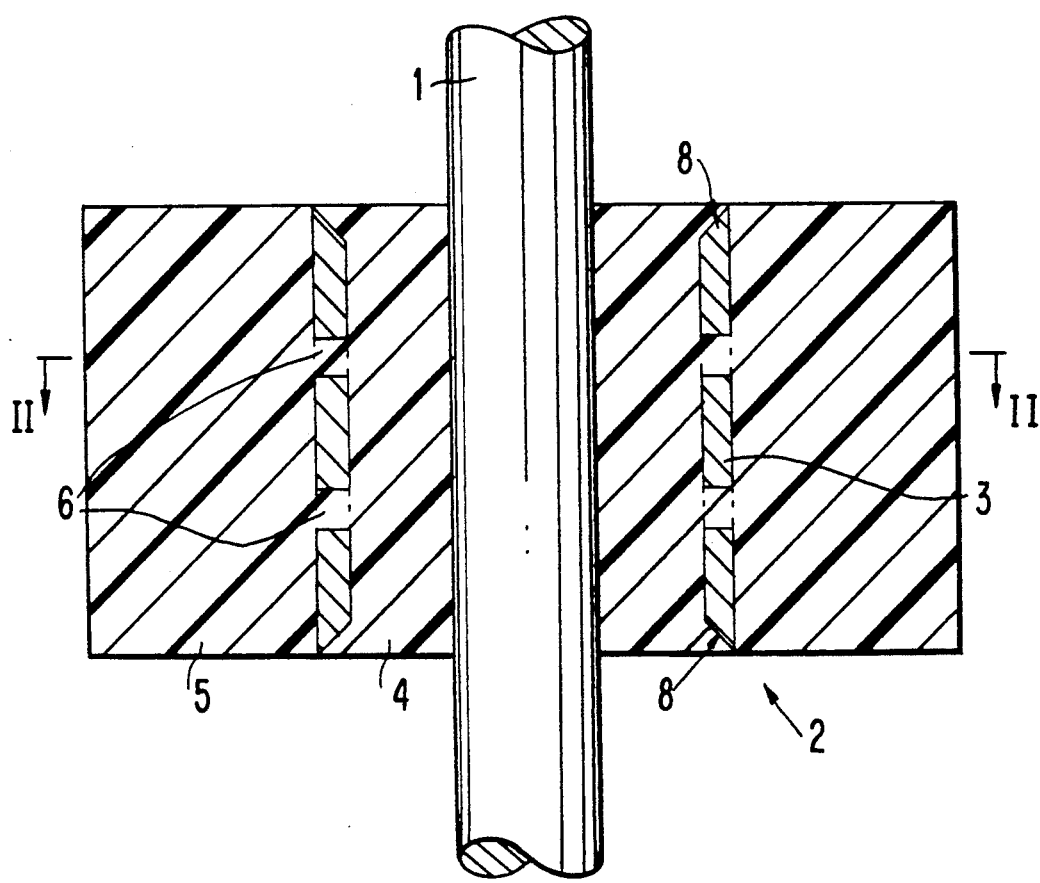
FIG. 1 Shows a transverse section through the roller in an axial plane.

A shaft 1 has pressed onto it the roller consisting of an elastic body 2 and a rigid bushing 3 arranged concentrically therein.

Body 2 is composed of two cylinder parts 4 and 5 joined together. Cylinder part 4 applies by its outside diameter against the inside diameter of the rigid bushing 3. Cylinder part 5 applies by its inside diameter against the outside diameter of the rigid bushing 3.

Bushing 3, which may be made for example of aluminum, is provided with radial openings 6 arranged over the circumference and height of the bushing in uniform distribution, into which the elastomeric material constituting bridges 7 between the cylinder parts 4 and 5 flows during the pouring of body 2, the bridges 7 thus forming increments of said elastomeric mass connecting the tubular or cylinder parts 4 and 5.

Figure 2:
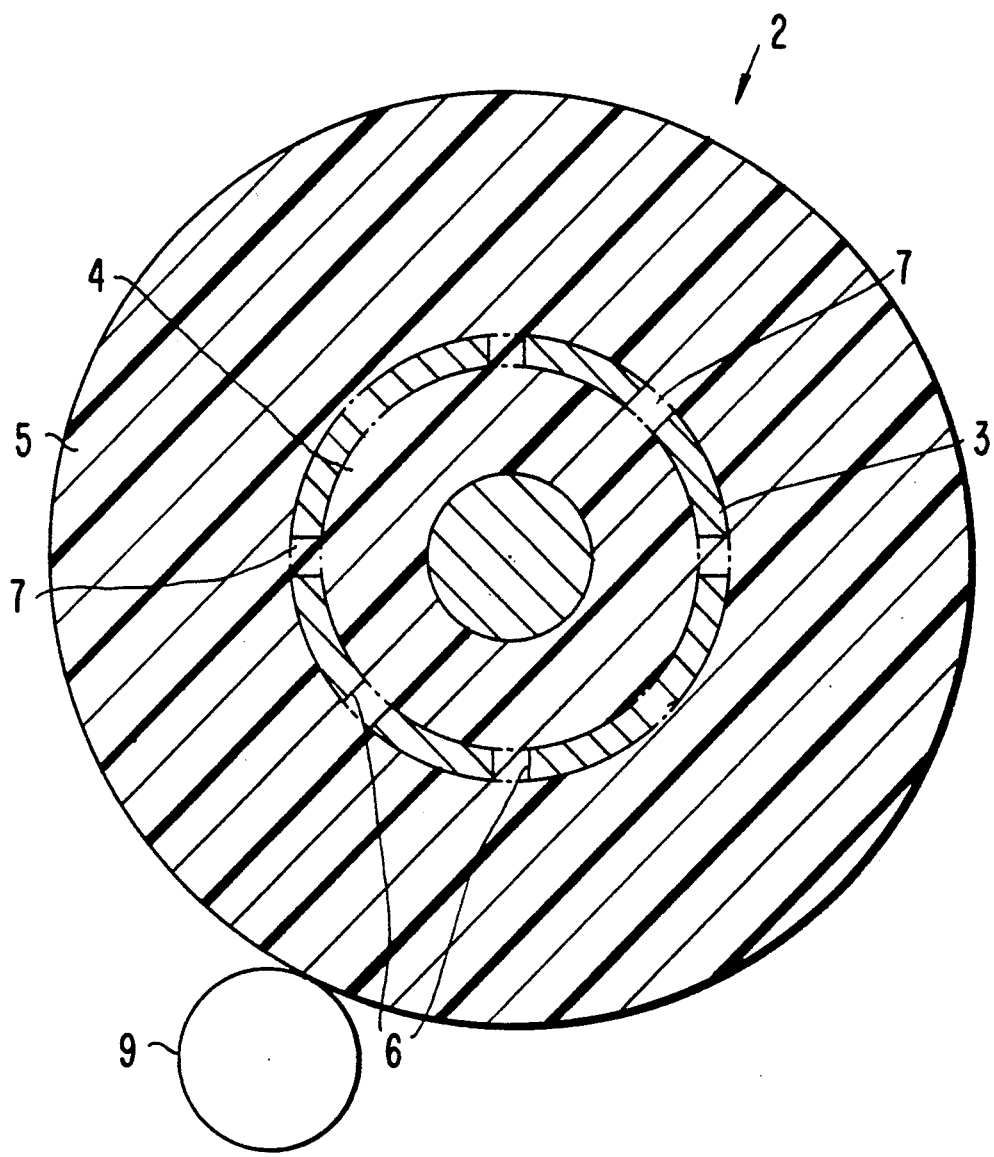
FIG. 2 A transverse section through the roller along line II—II of FIG. 1.

As previously noted, the thus formed transport roller may be mounted on a mandril, thereafter ground to precise roundness as by grinder 9 (FIG. 2), removed from the mandril and brought to final position on the shaft of the transport device without changing the form or dimension of the outer tubular part 5.

Each of the two end faces of the bushing 3 is provided with a bevel 8 directed toward the center of the bushing, so that it is possible to clamp the bushing 3 centered between correspondingly formed conical pieces inside the cavity of the mold for pouring the body 2.

As the inside diameter of the cylinder part 4 is smaller, in the relaxed state, than the diameter of shaft 1, there occurs a deformative pressing of the elastic material of the cylinder part 4, as the roller is being slipped onto shaft 1. This deformative pressing results in protection against skew between shaft 1 and body 2, without changing the form of the cylinder part 5, and without marring the shaft.

Having thus described the invention, what is claimed as new and sought to be protected by Letters Patent is:

1. A precision drive assembly for the transport of paper webs comprising a cylindrical shaft, a roller member mounted on said shaft, said roller member comprising an elastomeric body member and a rigid tubular cylindrical bushing having inner and outer peripheries, said body member being comprised of an integral elastomeric mass formed in situ over and in encompassing relation of said bushing and being of substantially uniform elasticity throughout in the unstressed condition thereof, said mass defining an inner elastomeric cylindrical tube disposed within and having an outer peripheral portion engaging said inner periphery of said bushing and an outer elastomeric cylindrical tube disposed externally of and having an inner periphery engaging said outer periphery of said bushing, said inner and outer cylindrical tubes being in co-axial alignment with the longitudinal axis of said cylindrical bushing and being of equal length therewith, the outer diameter of said shaft being greater than the inner diameter of said inner tube in the unstressed condition of said inner tube, said bushing including throughgoing apertures substantially uniformly distributed thereabout, said inner and outer cylindrical tubes being linked by increments of said mass extending through said apertures of said bushing, said inner cylindrical tube being sleeved over, axially slidable relative to, and in torque transmitting frictional driving engagement with said shaft.

2. A precision drive assembly in accordance with claim 1, wherein the thickness of the wall of said inner cylindrical tube is greater than the thickness of the wall of said bushing.

3. A precision drive assembly in accordance with claim 1, wherein said bushing includes end faces provided with bevels inclined relative to the longitudinal axis of said bushing.

4. A precision paper feed driver roll assembly fabricated by providing a tubular cylindrical metal bushing having inner and outer surfaces and a plurality of radially directed throughgoing holes connecting said surfaces, molding an integral liquid elastomeric mass over said bushing to form inner and outer concentric cylindrical tubular portions surrounding said inner and outer surfaces of said bushing and increments of material extending through said holes connecting said inner and outer tubular portions, providing a shaft having a longitudinal axis, thereafter frictionally mounting said inner tubular portion on said shaft, and thereafter rotating said shaft about said axis while simultaneously contacting said outer tubular portion with a grinding means to thereby render said outer portion concentric with said axis of said rotating shaft.

5. A precision paper feed driver roll assembly in accordance with claim 4, wherein said bushing and said inner and outer cylindrical tubular portions have a length dimension, said length dimension of said bushing and inner and outer concentric cylindrical portions being equal.

* * * * *